United States Patent [19]

Bosniack

[11] 3,887,422
[45] June 3, 1975

[54] ADHESIVE COMPOSITION AND METHODS
[75] Inventor: David S. Bosniack, Baytown, Tex.
[73] Assignee: Exxon Research and Engineering Company, Linden, N.J.
[22] Filed: Aug. 15, 1973
[21] Appl. No.: 388,707

Related U.S. Application Data
[63] Continuation-in-part of Ser. No. 245,389, April 19, 1972, abandoned.

[52] U.S. Cl. ............... 156/334; 161/236; 156/337; 260/28.5 AS
[51] Int. Cl. ............................................. C09j 3/14
[58] Field of Search ...... 260/28.5 AS; 156/334, 337

[56] References Cited
UNITED STATES PATENTS
3,144,423  8/1964  Belak ......................... 260/28.5 AS
3,634,546  1/1972  Hagemeyer et al. ............ 260/876 B Primary Examiner—Melvyn I. Marquis

[57] ABSTRACT

Compositions prepared by blending asphalt and reject polypropylene which contains a mixture of atactic and isotactic polypropylene and includes inorganic salts and other residues from the polypropylene manufacturing process have outstanding wetting characteristics and surprisingly high adhesive strengths. These compositions can be employed for bonding polyolefins, metals, woods, papers and a wide variety of other materials and can also be molded for use in other applications. Such compositions are superior to blends of asphalt and essentially pure atactic or isotactic polypropylene.

10 Claims, No Drawings

ADHESIVE COMPOSITION AND METHODS

CROSS-REFERENCE TO RELATED APPLICATIONS

This application is a continuation-in-part of application Ser. No. 245,389, filed in the U.S. Patent Office on Apr. 19, 1972 and now abandoned.

BACKGROUND OF THE INVENTION

1. Field of the Invention

This invention relates to compositions containing asphalt and polyolefins and is particularly concerned with improved compositions prepared by blending asphalt and a reject polypropylene which contains a mixture of atactic and isotactic polypropylene and includes inorganic salts and other residues from the polypropylene manufacturing process.

2. Description of the Prior Art

Conventional methods for the manufacture of polypropylene generally involve stereospecific polymerization of the propylene monomer in the presence of a catalyst containing a coordination complex of a transition metal halide and an aluminum alkyl or similar organo-metallic compound. The product from this reaction is a slurry of polypropylene and catalyst in a hydrocarbon diluent. A low molecular weight alcohol is normally added to this slurry to quench the reaction, precipitate crystalline or isotactic polypropylene, and solubilize the catalyst. Amorphous or atactic polypropylene remains in solution in the diluent. Subsequent steps of the process generally involve recovery of the precipitated isotactic polypropylene, neutralization of the active catalyst, and recovery of the alcoholic solution and hydrocarbon diluent. The isotactic polypropylene is normally recovered as a high purity polymer suitable for use in a wide variety of coating, casting and molding applications. The atactic polypropylene can be recovered from the remaining residue as an odorless, off-white, tacky thermoplastic material. Although at one time this material was of no commercial importance, it is now widely used as a hot-melt adhesive compounding agent. Since only about 10% of the total polypropylene product consists of the atactic polymer, this material is in very short supply.

The residue resulting from the process described above normally includes the inorganic salts used as the catalyst, color bodies and the like, and significant quantities of atactic and isotactic polypropylene. This material is generally referred to as "reject polypropylene". It normally contains a mixture of atactic and isotactic polypropylene and up to about 20% by weight of inorganic salts. Some water may be present and lesser quantities of solvent may also be included. The polypropylene component may comprise from 5 to about 95% atactic polypropylene and from 95 to about 5% isotactic polypropylene. Typically, the solid constituents may include about 45 weight percent atactic polypropylene, about 45% isotactic polypropylene and about 10% inorganic salts. Heretofore this material has been treated as a waste product. The presence of both atactic and isotactic polypropylene and the salts and other impurities contained in the material have precluded its use in applications for which polypropylene is conventionally employed.

SUMMARY OF THE INVENTION

In accordance with the present invention, it has now been found that reject polypropylene can be blended with asphalt to produce novel adhesive and molding compositions and that such compositions have properties which are surprisingly better than those of conventional atactic polypropylene and atactic polypropylene-asphalt blends. The improved compositions will normally contain from about 20 to about 80 weight percent asphalt and from about 80 to about 20 weight percent reject polypropylene. The use of from about 40 to about 70 weight percent asphalt and from about 60 to about 30 weight percent reject polypropylene is generally preferred.

The asphalts employed for purposes of the invention may have penetration values, by ASTM Method D5-25, of from about 20 to about 500, preferably from about 30 to about 350, and softening points, by ASTM Method D36-26, between about 25° and about 150° C., preferably between about 25° and about 85° C.

The reject polypropylene used in the compositions of the invention may contain from about 5 to about 95 weight percent atactic polypropylene, from about 95 to about 5 weight percent isotactic polypropylene, and from about 1 to about 20 weight percent inorganic salts. The use of reject materials containing atactic and isotactic polypropylene in proportions ranging from roughly equal quantities by weight up to about 3 parts of atactic polypropylene per part of isotactic polypropylene and including about 5 to about 20 weight percent salt is generally preferred.

Studies have shown that the compositions of the inventions have superior wetting abilities and surprisingly high adhesive strengths and are therefore excellent adhesive bonding materials for polyolefins, metals, woods, paper and a wide variety of other materials. Moreover, they exhibit very little cold flow at elevated temperatures, have excellent electrical insulating properties, possess good ductility, and have the ability to accept relatively large quantities of process oils, fillers, and other additive materials. The preferred compositions have unusually high ring and ball softening points and are surprisingly nontacky. They can be molded by conventional casting techniques and handled in molding equipment used with other thermoplastic materials. These properties and the low cost of the compositions of the invention make them suitable for a wide variety of different applications.

DESCRIPTION OF THE PREFERRED EMBODIMENTS

The improved compositions of this invention are prepared by blending asphalt and reject polypropylene, a by-product of conventional polypropylene manufacturing processes. The reject material may contain, on a dry basis, from about 5 to about 95 weight percent atactic polypropylene, from about 95 to about 5 weight percent isotactic polypropylene, and from about 1 to about 20 weight percent inorganic salts. The inorganic salts are present because of efforts in commercial polypropylene manufacturing processes to obtain an ash-free product and concentrate the metallic salts and other ash-forming constituents in the reject portion. Depending upon the particular manufacturing process and recovery techniques employed, water, solvents, catalysts and color bodies may also be present in a total concentration up to about 40% by weight.

The atactic and isotactic polypropylene constituents are normally present in reject polypropylene in ratios ranging from about 1:1 to about 3:1, ratios of from about 1:1 to about 2:1 generally being preferred. The compositions of representative reject polypropylenes are indicated in Table I below:

TABLE I

Characteristics of Polypropylene Materials

| Material | % Polymer Soluble in Boiling Heptane | % Polymer Insoluble in Boiling Heptane | % Ash | Molecular Weight Vis. Avg. | Wt. Avg. |
| --- | --- | --- | --- | --- | --- |
| Reject Polypropylene A | 40.5 | 46.0 | 13.5 | 155,000 | 195,000 |
| Reject Polypropylene B | 40.2 | 52.2 | 7.6 | 266,000 | 324,000 |
| Reject Polypropylene C | 50.5 | 43.6 | 5.9 | 182,000 | 240,000 |
| Reject Polypropylene D | 51.4 | 44.3 | 4.3 | 161,000 | 212,000 |
| Reject Polypropylene E | 48.8 | 42.7 | 8.5 | 83,000 | 109,000 |
| Reject Polypropylene F | 47.6 | 43.8 | 8.6 | — | — |
| Reject Polypropylene G | 60.7 | 31.1 | 8.2 | 81,000 | 112,000 |
| Reject Polypropylene H | 52.3 | 41.8 | 5.9 | — | — |
| Reject Polypropylene I | 59.8 | 32.5 | 7.7 | — | — |
| Reject Polypropylene J | 68.9 | 23.9 | 7.2 | — | — |
| Isotactic Polypropylene | 6.0 | 94.0 | 0.04–0.1 | — | — |
| Atactic Polypropylene | 100.0 | 0 | 0 | — | — |

In the above table, the material soluble in boiling heptane consists primarily of atactic polypropylene. The tabulated values for the material insoluble in boiling heptane have been adjusted by subtracting the ash values and thus indicate the amount of isotactic polypropylene present. The ash is due to inorganic salts. All of the values reported in the table are on a dry basis. It will be noted that the concentration of heptane solubles ranges from 40.2 weight percent to 68.9 weight percent, that the concentration of heptane insolubles varies from 23.9 weight percent to 52.2 weight percent, and that the ash content ranges from 4.3 to 13.5 weight percent. Similar properties for commercial isotactic and atactic polypropylenes are included in the table for purposes of comparison.

Molecular weight values on both a viscosity average and weight average basis for certain of the reject polypropylene compositions are included in Table I. These values, determined by gel permeation chromatography, show that the molecular weight of the polymeric materials may vary over wide ranges, again depending upon the particular manufacturing process and conditions employed in carrying out the process. In some cases the molecular weight values of reject polypropylenes suitable for purposes of the invention, as well as the heptane soluble, heptane insoluble and ash contents, may fall outside the ranges represented in Table I. It will be understood that the performance of the reject polypropylene in the compositions of the invention is governed to some extent by the relative amounts of atactic polypropylene, isotactic polypropylene and inorganic salts and that certain reject compositions may therefore be more effective for particular purposes than are others.

The asphalts employed for purposes of the invention are highly viscous hydrocarbon materials obtained from natural sources or as residual products from petroleum refining operations such as steam and vacuum distillation. Such materials are made up of a variety of components having molecular weights in the range of about 300 to 5,000 or higher. They generally contain from about 70 to about 85% carbon, from about 7 to about 12% hydrogen, and include small amounts of nitrogen, sulfur and oxygen. Saturated hydrocarbons, aromatic hydrocarbons and hydrocarbon resins containing heterocyclics, sulfur, nitrogen and oxygen compounds are usually present. Those components which have molecular weights above about 1,500 and are insoluble in pentane and hexane are normally referred to as asphaltenes. The asphalts employed for purposes of the invention will generally have penetration values between about 20 and about 500 as determined by ASTM method D5-25. Penetration values between about 50 and about 230 are normally preferred. The asphalts will generally have softening points as determined by ASTM method D36-36 between about 25° and about 150° C., preferably between about 30° and about 60° C.

The asphalts used in the improved compositions may be modified by blowing air through them at temperatures of about 300° to 500° F. if desired. This increases the hardness of the materials and tends to make them more plastic. Asphalts treated with sulfur, sulfur-containing materials, or halogen-containing materials in order to increase their consistency may also be employed. In general, however, such materials are somewhat more expensive than straight-run asphalts and hence the latter are normally preferred.

The compositions of the invention can be prepared by blending the components at elevated temperatures. The asphalt and reject polypropylene may be mixed at a temperature between about 300° and about 600° F., preferably between about 350° and about 450° F., and then any additive to be employed can be added to the resultant molten blend with stirring as necessary. It is generally preferred that the mixing be conducted under an inert atmosphere such as nitrogen in order to avoid undue oxidation of the materials. Conventional blending equipment may be employed. After the blending has been completed, the product is permitted to cool and is then packaged, is pumped into an insulated tank car for shipment, or is employed in the particular application for which it is intended.

Additives which may be incorporated in the compositions of the invention, either during the blending stage or by subsequent compounding, include tackifiers conventionally used in adhesive compositions, antioxidants, fillers such as limestone, fiberglass and asbestos, elastomers, other polymers, process oils, and the like. A wide variety of different additives have been employed in asphalt-polyolefin compositions and can be used for purposes of the invention if desired.

The compositions prepared as described above are particularly useful as adhesives and may be employed for bonding stainless steel, aluminum, brass and other metals, wood, paper, polyolefins and other plastics, rubber, leather, asbestos board, Masonite, fiberglass, Transite and the like. The compositions can be employed in various physical forms including films, liquids, pastes, putties, pellets of various shapes, granules, rods or ropes, and tapes or ribbons. They may be applied by brushing, extruding, flowing, gravity feed coating, immersion, knife coating, roller coating, spraying or by means of a pressure gun.

The compositions of the invention are particularly useful for the manufacture of laminated products from polyolefins, fabric, wood, metals and the like. The term "laminated product" as used herein refers to a product comprising two or more relatively thin layers of plies of material which are bonded together with an adhesive material. All of the plies may be of the same material or plies of two or more different materials may be employed. A laminated wood product is such a laminate in which at least one of the plies is wood. Typical of such materials are plywoods and veneered woods in which a veneer of a hard, relatively expensive wood is bonded to a core of a cheaper wood. Also contemplated are wood products in which a sheet of plastic or metal is bonded to a wood core. Many conventional adhesives are not satisfactory for use in such applications because they lack the small amount of polarity which is generally required for bonding the materials to wood. The materials of the invention permit the production of laminated products of high strength at relatively low costs.

The adhesives of the invention are also useful for laminating kraft paper to form bags, cardboard and similar products; for bonding kraft paper to plastic films, polyolefin sheets, woven polyolefin ribbon yarn fabrics, nonwoven polyolefin fabrics, burlap and other fabrics, metal foils and the like; as carpet adhesives; and for the manufacture of self-lying carpet tiles.

A typical bonding technique for the formation of a laminated product involves the placing of the hot adhesive material between the two plies to be bonded and the exertion of pressure to secure the proper thickness and bonding. Excellent bonds can be obtained over a wide range of pressures between about 1 psi and about 2,000 psi, preferably between about 5 psi and about 100 psi. For most applications, the temperature of the adhesive compositions should be sufficiently above the melting point so that good flow and contact will be obtained. The temperatures employed should be selected so that they do not exceed the char or liquefaction temperature of the particular materials being bonded. Generally speaking, the bonding time may range from about 5 seconds to about 1 hour and will preferably be between about 60 seconds and about 3 minutes. If the substrate to be bonded is an effective thermal conductor, it should also be heated to prevent extensive cooling of the adhesive material. The quantity of adhesive which will be used will generally range from about 1 to about 50 weight percent of the finished product, preferably from about 1 to about 5 percent by weight. Hot melt bonding techniques in which the adhesive is handled in solid form until just prior to application and then melted in any of a variety of ways and applied to the substrate are particularly effective when used with the improved materials. A solvent is generally not employed in applications of this type.

The adhesive compositions of the invention are characterized by very little flow at elevated temperatures, excellent electrical insulating properties, superior ductility, and the ability to accept relatively large quantities of process oils without noticeable loss of sag properties. Most of the compositions are surprisingly non-tacky and can be modified by the addition of tackifiers and other conventional additives to achieve a broad range of properties. The materials have superior wetting abilities, high adhesive strength, and are relatively low in cost. As a result of these and other characteristics, the improved additive compositions of the invention have many applications.

The invention is further illustrated by the following examples:

EXAMPLE 1

A series of compositions were prepared by blending asphalts having different penetration values with reject polypropylene. The blending was accomplished by heating and stirring the components in a resin flask under a nitrogen atmosphere for about 1 hour at between 400° to 425° F. until a homogenous mixture was obtained. The compositions prepared are summarized below in Table II.

TABLE II

| Composition | % Asphalt - Penetration | | % and Type of Polypropylene |
| --- | --- | --- | --- |
| A | 65% | 230 | 35% Reject |
| B | 70% | 230 | 30% Reject |
| C | 65% | 55 | 35% Reject |

The reject polypropylenes used in the compositions referred to above contained atactic polypropylene, isotactic polypropylene, and neutralized polymerization catalyst salts and were obtained as by-products from the manufacture of commercial polypropylene. All of the compositions were roughly comparable in appearance.

EXAMPLE 2

A blend of 50 parts by weight of asphalt having a penetration value of 51 at 77° F. and 50 parts by weight reject polypropylene was prepared according to the procedure outlined in Example 1. The material was poured into a procelain container and upon cooling could be removed from the container without the use of a release agent. The identical experiment was repeated with an asphalt having a penetration value of 89 and also resulted in a moldable product. Each of these materials could be elongated several thousand percent without breaking in the melt stage, thus indicating the ductility and fiberforming properties of the composition.

The properties of the blend prepared from the asphalt having 89 penetration were as follows:
Tensile strength—492 pounds per square inch
Elongation—36.8 percent
Tear strength—96.8 pounds per square inch

EXAMPLE 3

Polypropylene discs were bonded with the adhesive composition C of Example 1 in the following manner. A hot molten composition was applied to one of the polypropylene discs. The other polypropylene disc was quickly placed on top of the first one to form an adhesive sandwich. Slight pressure generated with the forefinger was used to obtain the requisite adhesive thickness and bond. The resulting adhesive sandwich was very difficult to separate and could only be parted by prying it apart.

EXAMPLE 4

Additional compositions of the invention were prepared, characterized, and evaluated for various uses. The results are summarized below in Table III.

TABLE III

| Composition | Typical Physical Properties D | E |
|---|---|---|
| | 50% Asphalt - 230 Penetration 50% Reject - Polypropylene | 50% Asphalt - 51 Penetration 50% Reject - Polypropylene |
| Tensile, lbs., 77° F., 2"/min. | 350 – 450 | 400 – 450 |
| Elongation, % | 25 – 30 | 22 – 27 |
| Tear, lbs., 2"/min. | 60 – 90 | 60 – 90 |
| Hardness, Shore D | 28 – 31 | 29 – 33 |
| Softening point, R&B, °F. | 310 – 315 | 310 – 315 |
| Brookfield viscosity, cps. at 450° F. | 6,000 – 12,000 | 4,000 – 8,000 |
| 500° F. | 3,000 – 7,000 | 2,000 – 3,000 |
| Moldability and release | Very good | Very good |

Potential for use as insulation (sound, electrical, thermal) and for molded items.

| Composition | F | G |
|---|---|---|
| | 65% Asphalt - 51 Penetration 35% Reject - Polypropylene | 65% Asphalt - 230 Penetration 35% Reject - Polypropylene |
| Softening point, R&B, °F. | 305 – 310 | 305 – 315 |
| Brookfield viscosity, cps. at 350° F. | 3,000 – 4,000 | |
| 400° F. | 1,400 – 1,600 | 3,000 – 6,000 |
| 450° F. | 700 – 900 | 2,000 – 4,000 |
| Adhesion (as hot melt) | Excellent | Excellent |

Potential for use as adhesive base, laminate base, or saturant and in related applications.

EXAMPLE 5

The reject polypropylene/asphalt compositions of the invention are significantly superior to atactic polypropylene/asphalt compositions as is shown below in Table IV.

TABLE IV

| | Softening point | Sag Point |
|---|---|---|
| 50% asphalt/50% polypropylene | | |
| (a) from reject polypropylene | 310–315° F. | 300° F. |
| (b) from atactic polypropylene | 205° F. | 225° F. |
| 65% asphalt/35% polypropylene | | |
| (a) from reject polypropylene | 310° F. | 290° F. |
| (b) from atactic polypropylene | 184° F. | 200° F. |

The higher softening and sag points using the reject material result in a stronger adhesive bond which is resistant to higher surface temperature as compared to compositions based on the atactic polymer.

EXAMPLE 6

Compositions were evaluated in various standard tests for tensile and peel strength. The compositions of the invention were outstanding as compared to a commercial adhesive. The results are summarized below in Table V.

TABLE V

Adhesive Base Test Data

| Lap Shear Tensile Test, 0.05"/min., 77° F. (ASTM D-1002-64) | |
|---|---|
| Composition F/Aluminum | 243 psi |
| Composition G/Aluminum | 168 psi |
| Eastobond M-5L (Amorphous polypropylene from Eastman)/Aluminum | 47 psi |
| Composition F/Polypropylene | 121 psi |
| Composition G/Polypropylene | 95 psi |
| T-Peel Test, 2"/min., 77° F. (modified ASTM D-1876-61T) | |
| Composition G/Aluminum | 3.6 lbs (cohesive failure) |
| Composition G/Polypropylene | 4.8 lbs (cohesive failure) |

EXAMPLE 7

Composition G was evaluated for compatibility with various extenders or additives. The results are summarized below in Table VI.

TABLE VI

Compatibility With Additives

| | General Compatibility | | | Compatibility After Temperature Cycling | | Compatible With Other Additives Listed |
|---|---|---|---|---|---|---|
| Additive | 50% | 25% | 10% | 50% | 25% | 2–25% |
| Oils | G | G | G | G | G | G |
| Resins | F-P | G | G | P | G | G |
| Waxes | G | G | G | G | G | G |
| Rubbers | F-P | G-F | G | F-P | G-F | G |

TABLE VI —Continued

Compatibility With Additives

| Additive | General Compatibility | | | Compatibility After Temperature Cycling | | Compatible With Other Additives Listed |
|---|---|---|---|---|---|---|
|  | 50% | 25% | 10% | 50% | 25% | 2–25% |
| Selected Plastics | F–G | G–F | G | F–G | G | G |
| Organic Additives | — | — | G | — | — | G |

G = Good
F = Fair
P = Poor

EXAMPLE 8

Composition G was evaluated for chemical resistance to various substances. The results are summarized below in Table VII.

TABLE VII

Chemical Resistance

| | Good | Fair | Poor |
|---|---|---|---|
| Conc. Hydrochloric Acid | x | | |
| Conc. Nitric Acid | x | | |
| Dilute Sulfuric Acid | x | | |
| 3% Hydrogen Peroxide | x | | |
| 25% Aq. Sodium Hydroxide | x | | |
| Acetic Acid | | x | |
| Isopropanol | x | | |
| Acetone | | x | |
| Hydrocarbons | | | x |
| Chlorinated Hydrocarbons | | | x |

EXAMPLE 9

Composition D was evaluated for electrical volume resistivity in comparison with various other materials. The results are summarized below in Table VIII.

TABLE VIII

Electrical Property Comparisons

| "Plastic" | Volume Resistivity (ohm/cm.) |
|---|---|
| Fluorocarbon | $1 \times 10^{18}$ |
| Polyethylene | $1 \times 10^{16}$ |
| Vinyl (unfilled) | $1 \times 10^{15}$ |
| Composition F | $1.95 \times 10^{15}$ |
| Polystyrene | $2 \times 10^{14}$ |
| Neoprene (unfilled) | $1 \times 10^{13}$ |
| Polyvinyl chloride | $1 \times 10^{12}$ |
| Phenolic | $1 \times 10^{11}$ |
| Neoprene (filled) | $1 \times 10^{10}$ |
| "Semi-conductive plastics" | $1 \times 10^{3}$ |

EXAMPLE 10

Composition F was evaluated with different types of substrates as a rough indication of its utility as a general purpose bonding material. The results are summarized below in Table IX.

TABLE IX

Substrate Bond Characteristics

| Substrate | Bond Characteristic |
|---|---|
| Acetal (Delrin) | VG |
| Aluminum | VG |
| Asbestos | VG |
| Bakelite | VG |
| Brass | VG |
| Canvas | VG |
| Ceramic | VG |
| Fiberglass | VG |
| Glass | VG |
| Masonite | VG |
| Mylar | P |
| Nylon | VG |
| Paper | VG |
| Polycarbonate (Lexan) | VG |
| Polyester | G |
| Polyethylene | VG |
| Polypropylene | VG |
| Rubber (Hard) | G |
| Rubber (Silicone) | P |
| Steel (Galvanized and Stainless) | VG |
| Transite | VG |
| Wood | VG |
| PVC | VG |
| Generally Polyolefins | VG |
| ABS | VG |

VG = Very Good
G = Good
P = Poor

As can be seen from the above table, the adhesive compositions of the invention bond well to a wide variety of substrates.

The general characteristics and usefulness of the compositions of the invention are summarized as follows: The compositions of the invention are thermoplastics which offer potential in many areas
 Protective coating for metal, plastic, wood, etc.
 Adhesive base for hot melts and laminates.
 Saturant for asbestos and fiberglass.
 Blending medium or matrix to induce better compatibility of ingredients.
 Electrical, sound, and thermal insulator.
 Molded items such as battery cases.
 Strippable protective films.
The compositions generally have the following characteristics
 Good thermal dimensional stability (> 300° F.).
 Relatively sharp solid - liquid transition.
 Little or no tack or stain.
 Compatible with a wide variety of performance modifying additives.
 Accept high filler loadings without appreciable embrittlement.
 Good electrical insulation properties.
 Antioxidant and heat stability properties.
Adhesive base compositions; in addition provide
 Good adhesion to many traditional substrates as well as problem substrates.
 A unique ability to wet a wide variety of substrates.
Semi-Plastic composites made from the composition of the invention
 Mold well and release easily.
 Are relatively slow burning — oxygen index is about 20.5

Adhesive compositions of the invention can also be used as a binder material to bond particles such as olefin powders, plastics, metals, wood and other materials indicated above to be bondable to these novel compositions. The resulting composites could be used for solid lubricants, increased conductivity articles, magnetic articles, and the like.

I claim:

1. A method for bonding two substances together which comprises in combination the steps of:
   a. wetting at least a portion of the surface of each of said substances with an adhesive composition comprising (i) from about 20 to about 80 weight percent of a reject polypropylene containing, on a dry basis, from about 5 to about 95 weight percent of atactic polypropylene, from about 95 to about 5 weight percent isotactic polypropylene, and from about 1 to about 20 weight percent inorganic salts and (ii) from about 80 to about 20 weight percent asphalt; and
   b. contacting said wetted surfaces with one another under sufficient pressure to create a strong bond between said substances.

2. A method according to claim 1 wherein said adhesive comprises from about 35 to about 50 weight percent reject polypropylene and from about 65 to about 50 weight percent asphalt.

3. A method according to claim 1 wherein at least one of said substances is a polyolefin.

4. A method according to claim 1 wherein said adhesive is about 65 weight percent asphalt and about 35 weight percent reject polypropylene.

5. A method according to claim 1 wherein at least one said substances is paper.

6. A method according to claim 1 wherein at least one of said substances is wood.

7. A method according to claim 1 wherein at least one of said substances is metal.

8. A method according to claim 1 wherein said adhesive composition is applied as a hot melt.

9. A method according to claim 1 wherein at least one of said substances is aluminum.

10. A method according to claim 1 wherein at least one of said substances is fiberglass.

* * * * *